United States Patent [19]
Gay

[11] Patent Number: 5,659,602
[45] Date of Patent: Aug. 19, 1997

[54] TELEPHONE APPARATUS FOR CALLER ID

[75] Inventor: Michael John Gay, Vaud, Switzerland

[73] Assignee: Motorola, Inc., Schaumburg, Ill.

[21] Appl. No.: 493,196

[22] Filed: Jun. 20, 1995

[30] Foreign Application Priority Data

Jun. 20, 1994 [GB] United Kingdom .................. 9412365

[51] Int. Cl.$^6$ .......................... H04M 1/56; H04M 15/06; H04M 1/00; H04M 3/00
[52] U.S. Cl. .......................... 379/142; 379/377; 379/380
[58] Field of Search .................. 379/142, 188, 379/199, 200, 201, 377, 373, 376, 380, 387, 395, 418, 419

[56] References Cited

U.S. PATENT DOCUMENTS

| | | | |
|---|---|---|---|
| 4,242,539 | 12/1980 | Hashimoto | 379/142 |
| 4,320,258 | 3/1982 | McDonald | 379/142 |
| 4,748,664 | 5/1988 | Blomley | 379/395 |
| 5,117,452 | 5/1992 | Callele et al. | 379/142 |
| 5,263,084 | 11/1993 | Chaput et al. | 379/142 |
| 5,454,031 | 9/1995 | Gray et al. | 379/106 |
| 5,546,448 | 8/1996 | Caswell et al. | 379/142 |

*Primary Examiner*—Curtis Kuntz
*Assistant Examiner*—Paul Loomis
*Attorney, Agent, or Firm*—Vincent B. Ingrassia; Rennie William Dover

[57] ABSTRACT

A telephone apparatus for connection to central office equipment to receive a caller ID signal therefrom and having an operating mode in which line current is less than a threshold at which off-hook state is detected, the line current drawn in said mode being sufficient to allow reception and processing of the caller ID signal. In this way, the telephone apparatus can receive and process the caller ID signal, and so can determine whether the call can be accepted, without the central office equipment recognizing the apparatus as having gone off-hook (i.e. having already accepted the call).

3 Claims, 1 Drawing Sheet

TELEPHONE APPARATUS FOR CALLER ID

BACKGROUND OF THE INVENTION

A modem or other telephone apparatus to which a call is addressed is sometimes required to display the identity of, or other relevant information pertaining to, a caller without accepting the call. Such a feature is commonly known as "caller ID".

In prior art caller ID arrangements, known for example from U.S. Pat. Nos. 4,672,660 and 4,598,179, the receiving apparatus goes off-hook, then identifies the caller information and finally determines whether the call may proceed.

It would be desirable for the receiving apparatus to be able to identify the caller information and determine whether the call may proceed before the apparatus goes off-hook and the telephone exchange-recognises the call as accepted.

SUMMARY OF THE INVENTION

In accordance with the invention there is provided a telephone apparatus for connection to central office equipment to receive a caller ID signal therefrom and having an operating mode in which line current is less than a threshold at which off-hook state is detected, the line current drawn in said mode being sufficient to allow reception and processing of the caller ID signal.

It will be understood that in this way the telephone apparatus can receive and process the caller ID signal, and so can determine whether the call can be accepted, without the central office equipment recognising the apparatus as having gone off-hook (i.e. having already accepted the call).

Preferably, in the low current operating mode only reception of calls is possible.

Preferably, energy from a ring signal is used to pre-charge a capacitor in the telephone apparatus' power supply circuit so that the low current operating mode for receiving and processing the caller ID signal can be active immediately after the ring signal.

BRIEF DESCRIPTION OF THE DRAWINGS

One telephone apparatus in accordance with the present invention will now be described, by way of example only, with reference to the accompanying drawing, in which.

DESCRIPTION OF THE PREFERRED EMBODIMENT

Figure 1:
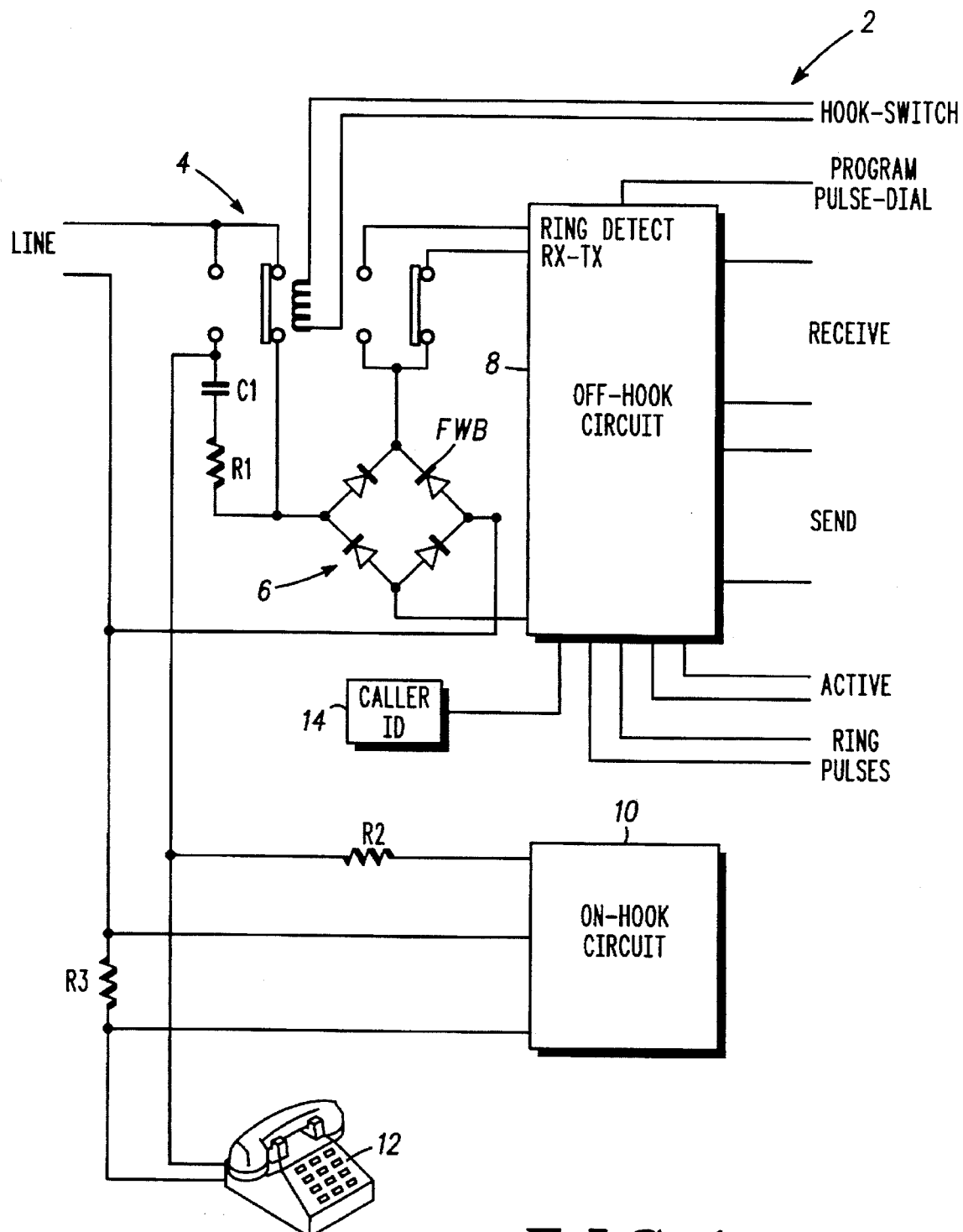
FIG. 1 shows a schematic circuit diagram of the telephone apparatus.

Referring now to FIG. 1, a telephone apparatus 2 for connection to remote central office equipment (not shown) via the LINE comprises a Hook Switch 4, a power supply arrangement 6, an Off-Hook Circuit 8, an On-Hook Circuit 10 and a mouthpiece/earpiece shown symbolically as 12.

The power supply arrangement 6 includes a capacitor C1 (having a value of approximately 470 nF), a resistor R1 (having a value of approximately 1.2KΩ) and full wave bridge rectifier FWB.

The Off-Hook Circuit 8 provides/receives the following signals for interfacing in conventional manner with a modem (not shown): Program, Pulse Dial, Receive, Active and Ring Pulses. As will be further explained below, the Off-Hook Circuit 8 receives and processes caller ID signals.

The On-Hook Circuit 10 is coupled to the LINE via resistors R2 (having a value of approximately 470KΩ) and R3 (having a value of approximately 10Ω).

The Off-Hook Circuit 8 contains voice-band processing circuits to send and receive data, dc mask circuits to provide defined characteristics to the line and ring signal detection circuits.

In the On-Hook condition the ring signal detection circuits are coupled to the line via the network R1, C1. Part of the energy of a ring signal, received via the network R1, C1 and the rectifier bridge FWB, is used to charge a reservoir capacitor (not shown) connected across the power supply lines of the voice-band and dc mask processing sections of the Off-Hook Circuit. The remaining energy serves to power the ring detection section itself.

During the pause following a detected ring signal the Hook-Switch is operated to connect the Off-Hook Circuit 8 to the telephone line, via the rectifier bridge so that caller ID information may be received. The Off-Hook Circuit 8 is, however, arranged to absorb only just sufficient current for this function. This current would not be sufficient to establish the supply voltage on the reservoir capacitor within an acceptable delay. The circuit is able to operate immediately in this way only because the reservoir capacitor is charged by the ring signal as described above.

Thus, the Off-Hook Circuit 8 senses if the received call contains caller ID information (sent between ring pulses), and if so detects and processes that information in conventional manner. For example, the caller's telephone number encoded in the caller ID information may be displayed on a visual display 14. The user of the apparatus 2 can read and identify the displayed-caller's telephone number and decide whether to accept the call.

As explained above, in accordance with the invention, the Off-Hook Circuit 8 is designed that, when operating in the "caller ID" mode, the current drawn from the LINE is below the threshold used by the central office equipment to sense that the telephone apparatus 2 is in the off-hook state.

It will be understood that in this way the telephone apparatus can receive and process the caller ID signal, and so can determine whether the call can be accepted, without the central office equipment recognising the apparatus as having gone off-hook (i.e. having already accepted the call).

It will be understood that the particular means of achieving low current consumption in the "caller ID" mode is not important, and that a variety of methods of implementing the Off-Hook Circuit 8 with the necessary low current consumption will be immediately apparent to a person skilled in the art without any further explanation or guidance.

It will further be appreciated that various other modifications or alternatives to the above described embodiment will be apparent to a person skilled in the art without departing from the inventive concept.

I claim:

1. A telephone apparatus for connection to central office equipment to receive a caller ID signal therefrom and having an operating mode in which line current is less than a threshold at which off-hook state is detected, the line current drawn in said mode being from an energy in a ring signal and sufficient to allow reception and processing of the caller ID signal.

2. The telephone apparatus of claim 1 wherein in the low current operating mode only reception of calls is possible.

3. The telephone apparatus of claim 1 wherein the energy from a ring signal is used to pre-charge a capacitor in the telephone apparatus' power supply circuit so that the low current operating mode for receiving and processing the caller ID signal can be active immediately after the ring signal.

* * * * *